United States Patent
Kintea et al.

(10) Patent No.: US 12,168,965 B2
(45) Date of Patent: Dec. 17, 2024

(54) VEHICLE DRIVE COMPRISING VACUUM SYSTEM AND EJECTOR

(71) Applicant: NORMA Germany GmbH, Maintal (DE)

(72) Inventors: Daniel Kintea, Maintal (DE); Lukasz Gabrys, Pilica (PL); Michal Sajdak, Pilica (PL); Gerrit von Breitenbach, Maintal (DE); Janusz Szwajkosz, Pilica (PL)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 18/029,456

(22) PCT Filed: Aug. 4, 2021

(86) PCT No.: PCT/EP2021/071799
§ 371 (c)(1),
(2) Date: Mar. 30, 2023

(87) PCT Pub. No.: WO2022/069099
PCT Pub. Date: Apr. 7, 2022

(65) Prior Publication Data
US 2023/0374956 A1    Nov. 23, 2023

(30) Foreign Application Priority Data
Sep. 30, 2020   (DE) .................... 10 2020 125 565.9

(51) Int. Cl.
*F02M 25/08*     (2006.01)
*F01M 13/02*     (2006.01)
(Continued)

(52) U.S. Cl.
CPC .......... *F02M 25/08* (2013.01); *F01M 13/021* (2013.01); *F04F 5/20* (2013.01); *F04F 5/46* (2013.01); *F01M 2013/026* (2013.01)

(58) Field of Classification Search
CPC ...... F02M 13/02; F02M 13/021; F02M 25/07; F02M 25/0706; F02M 25/0713;
(Continued)

(56) References Cited

U.S. PATENT DOCUMENTS 8,083,495 B2    12/2011    Whaling et al.
8,474,270 B2 *   7/2013    Schott ..................... F02K 1/386
                                                          60/785

(Continued)

FOREIGN PATENT DOCUMENTS

CN         106064122 A      11/2016
DE      102009026329 A1     3/2010
(Continued)

OTHER PUBLICATIONS

German Office Action for German Application No. 102020125565.9 dated Jul. 1, 2021 (7 pages).
(Continued)

*Primary Examiner* — Hai H Huynh
*Assistant Examiner* — Johnny H Hoang
(74) *Attorney, Agent, or Firm* — REISING ETHINGTON, P.C.

(57) ABSTRACT

A vehicle drive having a vacuum system for a vehicle having an internal combustion engine that is connected to a supply air line and to an exhaust air line. The vacuum system has an ejector. A propellant gas line opens into a nozzle channel of a propellant nozzle of the ejector. The nozzle channel opens into a mixing chamber of the ejector through a nozzle opening. A suction line opens into the mixing chamber and the mixing chamber on an outlet side opens directly or (Continued)

indirectly into a mixed gas line. The mixed gas line opens into the supply air line. The suction line is connected to a vacuum consumer, and the nozzle opening in the propellant nozzle is formed by a nozzle edge having teeth and/or corrugations.

16 Claims, 4 Drawing Sheets

(51) Int. Cl.
    *F04F 5/20* (2006.01)
    *F04F 5/46* (2006.01)

(58) Field of Classification Search
    CPC ............... F02M 25/08; F02M 25/0818; F02M 25/0836; F02M 25/0854; F02M 25/0856; F02M 35/02; F02M 35/10118; F02M 35/10255; F02M 35/104; F04F 5/20; F04F 5/46; F04F 5/14; F04F 5/44
    See application file for complete search history.

(56) References Cited

U.S. PATENT DOCUMENTS

| | | | |
|---|---|---|---|
| 9,239,034 B2 | 1/2016 | Cunningham et al. | |
| 9,322,289 B2 | 4/2016 | Pursifull | |
| 10,760,534 B2* | 9/2020 | Akiyama | F02M 25/089 |
| 11,041,452 B2 | 6/2021 | Dudar | |
| 2007/0256420 A1 | 11/2007 | Schott et al. | |
| 2014/0123941 A1* | 5/2014 | Ulrey | B60T 13/52 |
| | | | 123/349 |
| 2015/0159665 A1* | 6/2015 | Fletcher | F04D 27/0215 |
| | | | 415/58.4 |
| 2015/0345517 A1* | 12/2015 | Fletcher | F04F 5/16 |
| | | | 417/65 |
| 2016/0010661 A1* | 1/2016 | Fletcher | F04F 5/20 |
| | | | 417/174 |
| 2016/0040688 A1* | 2/2016 | Fletcher | F02M 35/10255 |
| | | | 417/195 |
| 2019/0048830 A1 | 2/2019 | Akiyama | |
| 2019/0107081 A1* | 4/2019 | Dudar | F02D 41/0037 |

FOREIGN PATENT DOCUMENTS

| | | |
|---|---|---|
| DE | 202008018127 U1 | 12/2011 |
| DE | 202013104001 U1 | 9/2013 |
| DE | 102013223188 A1 | 5/2014 |
| DE | 102016110018 A1 | 11/2017 |
| DE | 102016209573 A1 | 12/2017 |
| DE | 102019115049 A1 | 12/2019 |
| JP | 2016125471 A | 7/2016 |
| JP | 6549011 B2 | 7/2019 |

OTHER PUBLICATIONS

International Search Report for International Application No. PCT/EP2021/071799 dated Oct. 22, 2021 (12 pages).
English Translation of International Search Report for International Application No. PCT/EP2021/071799 dated Oct. 22, 2021 (2 pages).
Japanese Office Action for Japanese Application No. 2023-513081 dated Jan. 9, 2024 (5 pages).
English Translation of Japanese Office Action for Japanese Application No. 2023-513081 dated Jan. 9, 2024 (6 pages).

* cited by examiner

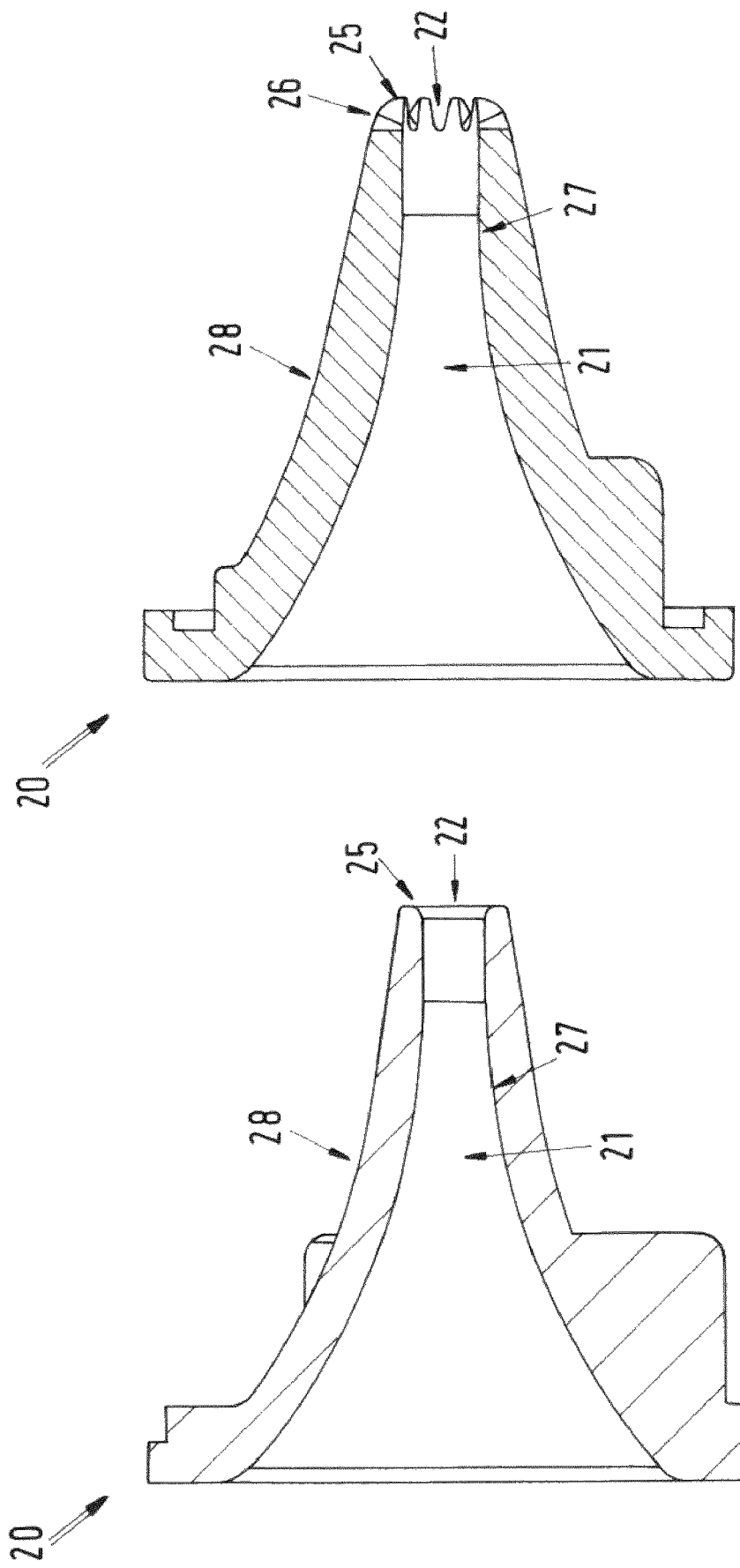

VEHICLE DRIVE COMPRISING VACUUM SYSTEM AND EJECTOR

INTRODUCTION

The disclosure relates to a vehicle drive with a vacuum system for a vehicle with an internal combustion engine.

In order to improve emissions values, it is possible in automotive engineering to actively ventilate engine housings, crankcases, transmission housings and fuel tanks and to feed the gases directly or indirectly to a purification device. Purification devices can be filters, catalytic converters and the exhaust gas section, which is likewise ultimately purified by way of filters and catalytic converters. Here, the ventilation can take place by means of a jet pump, in particular an ejector. This utilizes a primary gas stream, for example of a turbocharger, which sucks the ventilating gas by means of a nozzle out of the engine housing, crankcase, transmission housing or fuel tank. A jet pump which generates a negative pressure, that is to say has a predominantly extracting action, is usually called an ejector.

As, for example, DE 20 2013 104 001 U1 further states, negative pressure or vacuum can also be utilized for other actuators in the vehicle as drive force. For example, a negative pressure can be used to assist a driver during the application of the vehicle brakes. According to DE 20 2013 104 001 U1, an engine inlet manifold, a vacuum pump or precisely an ejector can serve as negative pressure source for the actuators. An ejector supplies vacuum by way of the provision of a low pressure region in a flow path of an operating fluid which can also contain, in particular, fuel vapors or untreated engine emissions.

In the case of an ejector, the operating fluid exits at high speed from a drive nozzle into a mixing chamber. Here, in accordance with Bernoulli's law, a dynamic pressure drop occurs. For this reason, the pressure in the flow is lower than the normal pressure. In the case of compressible propellants, in particular gases or vapors, the drive nozzle is frequently configured as a Laval nozzle in order to maximize the speed, and the drive jet exits at supersonic speed. In the mixing chamber, the drive jet of the operating fluid comes into contact with the suction medium which is situated here. After exit from the nozzle, shear stresses arise as a result of internal friction and turbulences in the boundary layer between the rapid operating fluid and the substantially slower suction medium. This stress brings about a transmission of momentum, with the result that the suction medium is accelerated and carried along. This is due to the fact that the suction medium is subjected to a pressure drop, the suction effect of which can be utilized to suck further suction medium via a suction piece into the mixing chamber. A diffuser can be connected downstream of the mixing chamber for a further pressure rise.

These functions and features which form the starting point of at least some embodiments of the disclosure can also in each case be inherent in the technically developed disclosure of this application.

It may be a disadvantage in the prior art that the turbulences between the operating fluid and the suction medium cause great pressure losses and have a low efficiency. In the case of turbocharged engines, a significant proportion of the turbo-compressed compressed air is thus branched off, in order to be utilized as operating fluid of an ejector. Therefore, the efficiency of the engine overall is impaired. A further disadvantage of the turbulences may be a resulting high volume level.

SUMMARY

It is therefore an object of at least some embodiments of the disclosure to provide a vehicle drive having a vacuum system for a vehicle, which vehicle drive has a high efficiency with a low development of noise. The solution is intended to function reliably and be inexpensive.

The disclosure relates to a vehicle drive with a vacuum system for a vehicle, with an internal combustion engine which is connected to an intake air line and an outlet air line. The vacuum system has an ejector, a propellant line opening into a nozzle channel of a drive nozzle of the ejector. The nozzle channel opens through a nozzle opening into a mixing chamber of the ejector. In addition, a suction line opens into the mixing chamber, and the mixing chamber opens on the outlet side directly or indirectly, in particular indirectly via a diffuser, into a mixed gas line. The mixed gas line in turn opens into the intake air line. Here, the suction line is connected to a vacuum consumer. According to at least some embodiments of the disclosure, the nozzle opening of the drive nozzle is configured by way of a nozzle edge with serrations and/or undulations.

It is advantageous, per at least some embodiments, here that the serrations and/or undulations reduce the turbulences, the air flow breakaway edge between the propellant and the suction medium being extended in comparison with a circular nozzle edge. This increases the efficiency of the ejector and also, if the throughput of propellant is reduced to the then necessary amount, the efficiency of the vehicle drive. Moreover, by way of reduction of the turbulences, the serrations and/or undulations also reduce the generation of noise. Measures for active and passive noise minimization are required to a lesser extent, which additionally increases the efficiency of the vehicle on account of weight savings. Here, the mixed gas line should open out of the mixing chamber in a manner which is flush with respect to the nozzle opening in the flow direction of the nozzle channel. The nozzle channel is preferably, per at least some embodiments, configured with a circular internal cross section; the drive nozzle is further preferably, per at least some embodiments, likewise configured with a circular external cross section at least in the region of the nozzle opening. Variants which have substantially linear flanks, for example triangle functions, sawtooth functions and rectangle functions, are to be understood as serrations, in particular. Variants with radii at the corners are not to be ruled out by this, however. Undulations are to be understood to mean, in particular, those geometries which have at least substantially continuous transitions, for example sinusoidal waveforms.

In accordance with one embodiment, the serrations and/or undulations of the nozzle edge are arranged on the inner side and/or the outer side of the drive nozzle. It is thus conceivable that the serrations and/or undulations point only inward, but the drive nozzle has a smooth surface on the outer side. In the reversed optional case, the undulations and/or serrations point only outward, and the inner face of the drive nozzle is smooth. As a third option, the serrations and/or undulations can be of fan-like configuration, with the result that they are configured so as to point inward and outward. In addition, this rather radial orientation of the serrations and/or undulations can also be configured so as to point in the flow direction of the nozzle channel.

In the case of one design and embodiment, the serrations and/or undulations of the nozzle edge point at least substantially in the flow direction of the nozzle channel. If the nozzle channel has a circular internal cross section, the projection of the nozzle edge is also substantially circular. This design is not very complex and can be produced comparatively inexpensively.

In accordance with one embodiment of the vehicle drive, the vacuum consumer is from the group comprising vacuum distributor, actuator, actuating member and ventilating cavity, in particular from the ventilating cavity group comprising engine housing, crankcase, transmission housing and fuel tank. These vacuum consumers are then supplied efficiently with negative pressure.

In one more detailed refinement of the vehicle drive, per at least some embodiments, the propellant line is branched off from the intake air line, the internal combustion engine or the outlet air line downstream of the mixed gas line in the flow direction. Therefore, the propellant stream is provided without great complexity.

The nozzle channel can optionally have an at least substantially cylindrical inner wall in the region of the nozzle opening. Here, the serrations and/or undulations extend, for example, at least substantially parallel to the flow direction.

One refinement is specifically suitable, per at least some embodiments, in accordance with which the serrations and/or undulations of the nozzle edge are oriented so as to be inclined in the direction of the center of the nozzle opening, in particular by between 0° and 35°. Here, as it were, they comb slightly through the outer region of the operating fluid stream, which improves the low-noise intake performance of the suction medium. As an alternative, per at least some embodiments, one refinement is also suitable, in accordance with which the serrations and/or undulations of the nozzle edge are oriented such that they are inclined in the direction away from the center of the nozzle opening, preferably by between 0° and 60°. This alternative can be combined particularly satisfactorily with a drive nozzle which is configured as a Laval nozzle.

In one embodiment, the serrations and/or undulations of the nozzle edge protrude into the mixing chamber, in particular in a free manner. In this way, the suction medium can flow efficiently onto the nozzle edge without turbulence in the flow direction of the operating fluid on the outer side of the serrations and/or undulations.

Furthermore, one refinement is particularly efficient, per at least some embodiments, in the case of which an inflow direction of the suction line into the mixing chamber is oriented at least substantially parallel to the nozzle chamber. The suction medium then does not have to perform any directional change. Accordingly, less turbulence results from the straightened individual streams during the merging at the nozzle edge.

The serrations and/or undulations should be arranged, in particular, distributed uniformly or regularly over the circumference. This results in uniform turbulence over the circumference. In one optional design variant, the serrations and/or undulations of the nozzle edge are of sinusoidal or triangle function-shaped configuration.

It may be specifically advantageous per at least some embodiments, with regard to the turbulence reduction if the troughs of the serrations and/or undulations are of more obtuse configuration than the peaks of the serrations and/or undulations.

In accordance with one embodiment, the serrations and/or undulations of the nozzle edge are of at least substantially two-dimensional configuration, preferably pointing at least substantially in the flow direction of the nozzle channel, with the result that the projection of the nozzle edge is at least substantially circular. A shape of this type can be produced comparatively inexpensively, in particular by the serrations and/or undulations being configured as a two-dimensional cut or molded line.

In a different embodiment, the serrations and/or undulations of the nozzle edge are of three-dimensional configuration, in particular pointing at least substantially in the flow direction of the nozzle channel and pointing at least substantially transversely with respect to the flow direction of the nozzle channel, with the result that the projection of the nozzle edge has an undulating or star-shaped periphery. As a result, the operating fluid is channeled in a linear manner on the inner side, and the length of the nozzle edge is particularly long as a result of the three-dimensional design. Serrations and/or undulations which are configured on the outer side of the drive nozzle can, as it were, channel the inflow of the suction medium in a linear manner onto the nozzle edge.

There is fundamentally the option per at least some embodiments, that no nozzle tip is arranged in the nozzle opening. This can be implemented simply in structural terms, in particular in the case of small embodiments, as are often sufficient in vehicles.

As an alternative embodiment, a nozzle tip can be arranged in the nozzle opening, in particular in such a way that an annular gap is configured between the nozzle opening and the nozzle tip. As a result, the ratio between the length of the nozzle edge and the volumetric flow of the operating fluid can be increased. The mixing and carrying along of the suction medium namely takes place substantially on the outer periphery of the operating fluid jet. In addition, the nozzle tip generates a type of slipstream which causes a sucking action into the center of the operating fluid jet downstream of the nozzle edge, which sucking action also grips the suction medium.

The ejector can also be a subject matter according to at least some embodiments of the disclosure per se, that is to say separate from the rest of the vehicle drive, and with its various optional embodiments. The ejector can then include the respective mandatory or optional components in accordance with designations 11 to 29, a propellant line connector of the ejector taking the place of the propellant line, and a mixed gas line connector of the ejector taking the place of the mixed gas line.

In the case of one refinement of the vehicle drive, and per at least some embodiments, a compressor, in particular an (exhaust gas) turbocharger or compressor, is arranged in the intake air line, the mixed gas line opening into the intake air line upstream of the compressor in the flow direction, and the propellant line being branched off from the intake air line, the internal combustion engine or the outlet air line downstream of the compressor in the flow direction. Accordingly, the back pressure from the intake air line is low, which results in a high efficiency during the intake of the suction medium. In addition, the pressure gradient across the compressor is utilized directly to provide the operating medium.

Furthermore, there is the option that an air filter is arranged in the intake air line, the mixed gas line opening into the intake air line downstream of the air filter in the flow direction, and the propellant line being branched off from the intake air line, the internal combustion engine or the outlet air line downstream of the opening mixed gas line in the flow direction. Harmful gases and aerosols are thus reliably kept circulating, and also cannot contaminate the air filter, for example by way of oils.

Furthermore, there is the option that an intercooler is arranged in the intake air line, the mixed gas line opening into the intake air line upstream of the intercooler in the flow direction, and the propellant line being branched off from the intake air line downstream of the opening mixed gas line and upstream of the intercooler in the flow direction. In this way, the intercooler can be of smaller configuration, since it does not also have to cool the operating fluid, but rather only the remaining air which is conducted to the internal combustion engine.

If present, one refinement is suitable, per at least some embodiments, in the case of which first of all the air filter, then the compressor and, adjoining this, the intercooler are arranged in the flow direction of the intake air line.

BRIEF DESCRIPTION OF THE FIGURES

Further features, details and advantages of the invention result from the wording of the claims and from the following description of exemplary embodiments on the basis of the drawings, in which:

FIG. 4a shows a detailed view of a first type of a nozzle edge of a drive nozzle, and FIG. 4b shows a detailed view of a second type of the nozzle edge of a drive nozzle.

DETAILED DESCRIPTION

Figure 1:
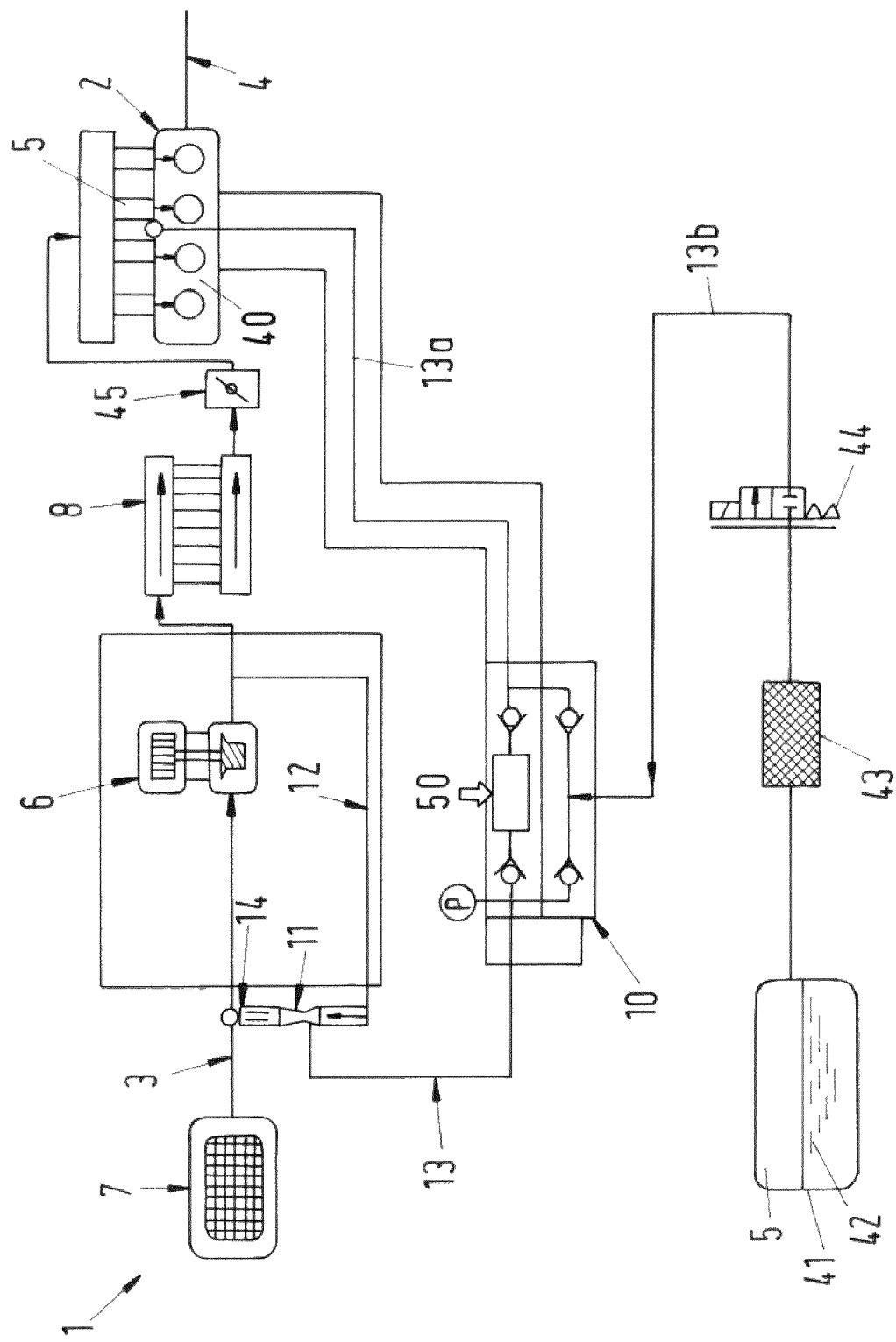
FIG. 1 shows a schematic diagram of a vehicle drive with a vacuum system.

FIG. 1 shows a schematic diagram of a vehicle drive 1 with a vacuum system 10 for a vehicle. This vehicle drive 1 has an internal combustion engine 2 with an intake air line 3 and an outlet air line 4. First of all an air filter 7, then a compressor 6 (namely an exhaust gas turbocharger in the present case), then an intercooler 8 and, after this, a throttle valve 45 are seated in the intake air line in the flow direction toward the engine 2. Moreover, the vehicle drive 1 has a tank 41, in which fuel 42 is stored, and in which a ventilating cavity 5 is configured above the fuel 42. The internal combustion engine 2 also has a ventilating cavity 5, namely in the crankcase 40.

Figure 2:
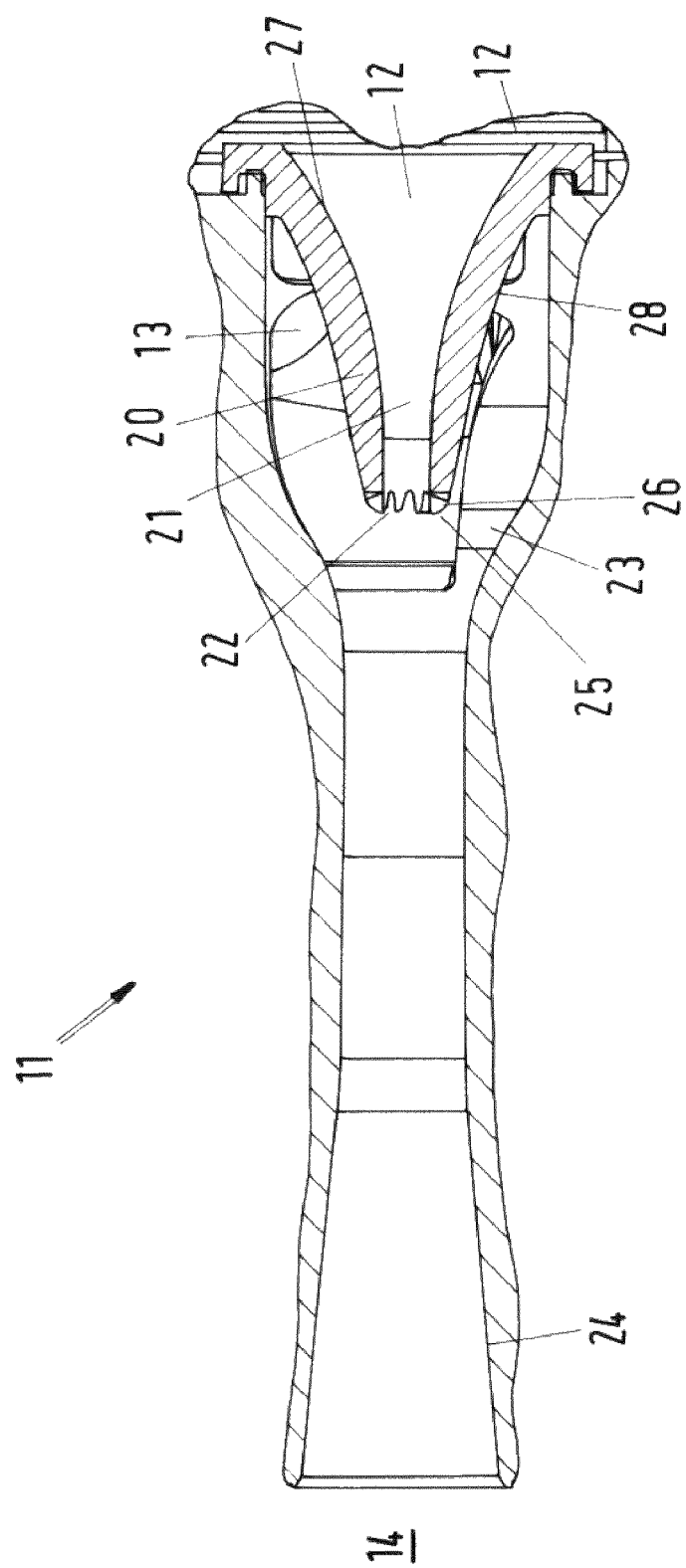
FIG. 2 shows a longitudinal section through an ejector.

The vacuum system 10 has an ejector 11. FIG. 2 shows an enlargement thereof as a longitudinal section. A core element of the ejector 11 is a drive nozzle 20 which protrudes into a mixing chamber 23. A propellant line 12 opens into a nozzle channel 21 of the drive nozzle 20. As a result of the tapering cross section of the nozzle channel 21, the operating fluid which flows through the propellant line 12 is accelerated and finally enters through a nozzle opening 22 into the mixing chamber 23 of the ejector 11. In addition, a suction line 13 is connected to the mixing chamber 23. On the outlet side, a mixed gas line 14 adjoins the mixing chamber 23 indirectly via a diffuser 24. The diffuser 24 can be configured as an individual component or as part of the ejector 11. The mixed gas line 14 is arranged so as to be aligned with the nozzle opening 22 in the flow direction of the nozzle channel 21. This applies at least to the portion which adjoins the mixing chamber 23 or the diffuser 24.

Figure 3B:
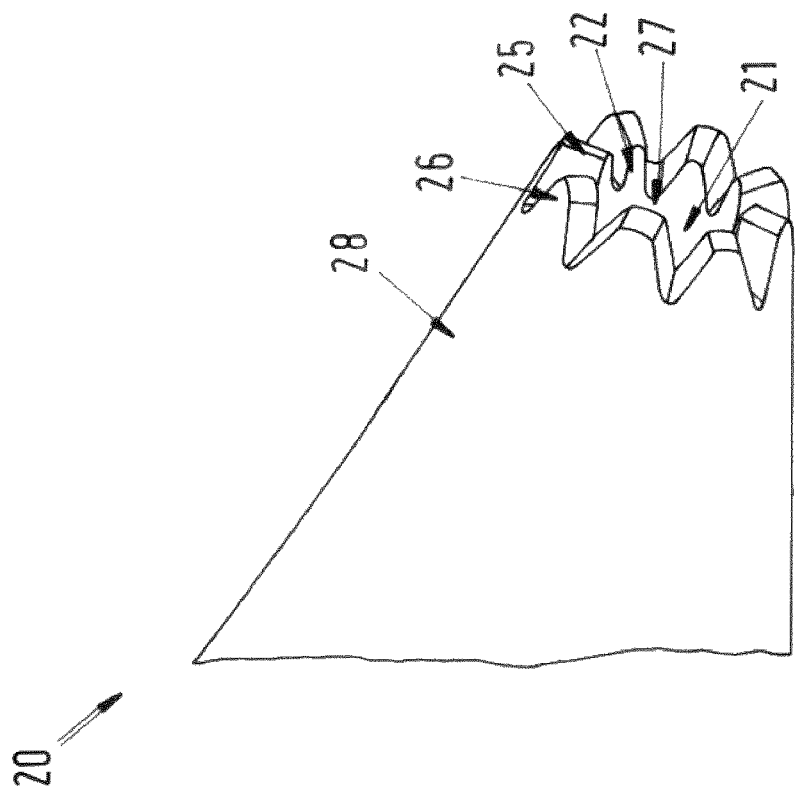
FIG. 3b shows a longitudinal section through a second type of a nozzle edge of a drive nozzle.
Figure 3A:
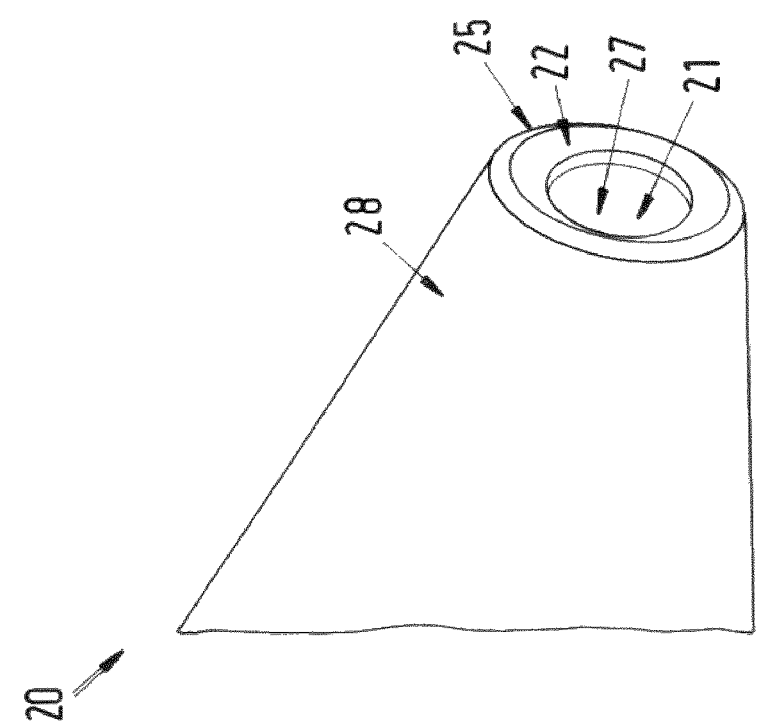
FIG. 3a shows a longitudinal section through a first type of the nozzle edge of a drive nozzle.

The nozzle opening 22 of the drive nozzle is configured by way of a nozzle edge 25 with serrations and/or undulations 26, as is shown in detail in FIG. 3b. FIG. 3a shows a variant without serrations and/or undulations 26 of this type. As can be seen, the serrations and/or undulations 26 of the nozzle edge 25 are of sinusoidal configuration; in particular, they are arranged distributed regularly or uniformly over the circumference of the nozzle edge 25. Moreover, they protrude freely into the mixing chamber 23 (see FIG. 2).

The serrations and/or undulations 26 of the nozzle edge 25 are as it were arranged on the inner side 27 and the outer side 28 of the drive nozzle 20, since both the operating medium flows past them on the inner side 27 of the drive nozzle 20 and the suction fluid flows past them out of the suction line 13 on the outer side 28. The serrations and/or undulations 26 of the nozzle edge 25 point at least substantially in the flow direction of the nozzle channel 21. They are aligned, in particular, with the conical outer side in the front region of the drive nozzle 20. As a result, the serrations and/or undulations 26 of the nozzle edge 25 are oriented so as to be inclined in the direction of the center of the nozzle opening 22.

In the present case, the serrations and/or undulations 26 of the nozzle edge 25 are of at least substantially two-dimensional configuration; they point at least substantially in the flow direction of the nozzle channel 21. As a result, a projection of the nozzle edge 25 is at least substantially circular. As a result of the inclination of the serrations and/or undulations 86 in the direction of the center of the nozzle opening 22, the projection has a slight corrugation on the circular path, however.

The serrations and/or undulations 26 of the nozzle edge 25 might also optionally be of three-dimensional configuration, in particular by pointing at least substantially in the flow direction of the nozzle channel 21 as in the above-described variant, and additionally pointing at least substantially transversely with respect to the flow direction of the nozzle channel 21. As a result, the projection of the nozzle edge 25 has a clearly corrugated or star-shaped circumference. This can be realized technically by way of a serration or undulation cut of the nozzle edge 25 and an additional peak and trough structure in the wall of the drive nozzle 20, namely on its inner side 27 and/or outer side 28. Figuratively speaking, this would be similar to a folded filter, the opening of which is additionally cut to size by pinking shears.

In a first variant, a nozzle tip 29 can be arranged in the nozzle opening 22 (not shown) in such a way that an annular gap is configured between the nozzle opening 22 or the nozzle edge 25 and the nozzle tip 29. The nozzle tip is then located in the center of the nozzle channel 21 and extends as far as into the region of the nozzle opening 22, preferably even a little out of the latter. A nozzle tip of this type can be connected, for example, by means of webs to the inner side 27 of the drive nozzle 20.

In a different variant which is shown here, however, no nozzle tip 29 of this type can also be arranged in the nozzle opening 22. In this way, the outlet area of the nozzle opening 22 has a full area, instead of being annular as with a nozzle tip.

The difference between a drive nozzle 20 without (FIG. 4a) and with (FIG. 4b) serrations and/or undulations 26 on the nozzle edge 25 can once again be seen in the longitudinal sections through in each case one drive nozzle 20 of FIGS. 4a and 4b. In contrast to the nozzle opening 22 of FIGS. 3a and 3b which rather opens from a flat frustoconical tip portion, the variant according to FIGS. 4a and 4b is of more pointed configuration. This applies, above all, to the outer wall 28. The inner wall even configures the smallest cross section just in front of the nozzle opening 22. From this smallest cross section, the nozzle channel 21 already widens again in the direction of the nozzle opening 22, if only slightly.

The ejector 10 with a drive nozzle 20 according to FIG. 3b or 4b is then integrated into the vehicle drive 1 according to FIG. 1 in such a way that the mixed gas line 14 opens into the intake air line 3 of the internal combustion engine 5, namely between the air filter 7 and the compressor 6. The propellant line 12 is branched off from the intake air line 3 downstream of the mixed gas line 14 in the flow direction, namely between the compressor 6 and the intercooler 8.

The suction line 13 is connected to a vacuum consumer, namely a vacuum distributor 50. From the latter, a first branch 13a of the suction line 13 in turn leads to the ventilating cavity 5 in the crankcase 40. A second branch 13b of the suction line 13 leads from the vacuum distributor 50 to the ventilating cavity 5 of the fuel tank 41. First of all an activated carbon filter 43 and then an electrically actuated valve 44, by way of which the ventilating cavity 44 is ventilated as required, are seated in the flow direction in the second branch 13b.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

The invention is not restricted to one of the above-described embodiments, but rather can be modified in a wide variety of ways.

All of the features and advantages which are apparent from the claims, the description and the drawing, including structural details, spatial arrangements and method steps, can be essential to the invention both per se and in a very wide variety of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Vehicle drive
2 Internal combustion engine
3 Intake air line
4 Outlet air line
5 Ventilating cavity
6 Compressor
7 Air filter
8 Intercooler
10 Vacuum system
11 Ejector
12 Propellant line
13 Suction line
13a Suction line to the crankcase
13b Suction line to the tank
14 Mixed gas line
20 Drive nozzle
21 Nozzle channel
22 Nozzle opening
23 Mixing chamber
24 Diffuser
25 Nozzle edge
26 Serration or undulation
27 Inner side
28 Outer side
40 Crankcase
41 Fuel tank
42 Fuel
43 Activated carbon filter/oil separator
44 Valve
45 Throttle valve
50 Vacuum distributor

The invention claimed is:

1. A vehicle drive with a vacuum system for a vehicle, with an internal combustion engine which is connected to an intake air line and an outlet air line,
the vacuum system having an ejector,
a propellant line opening into a nozzle channel of a drive nozzle of the ejector,
the nozzle channel opening through a nozzle opening into a mixing chamber of the ejector,
a suction line opening into the mixing chamber, wherein an inflow direction of the suction line into the mixing chamber is substantially parallel to the nozzle channel, and the mixing chamber opening on an outlet side directly or indirectly into a mixed gas line, and
the mixed gas line opening into the intake air line,
the suction line being connected to a vacuum consumer, wherein the nozzle opening of the drive nozzle is configured by way of a nozzle edge with serrations, undulations, or both serrations and undulations.

2. The vehicle drive as claimed in claim 1, wherein the serrations, undulations, or both serrations and undulations of the nozzle edge are arranged on the inner side of the drive nozzle, the outer side of the drive nozzle, or both the inner side and outer side of the drive nozzle.

3. The vehicle drive as claimed in claim 1, wherein the serrations, undulations, or both serrations and undulations of the nozzle edge point at least substantially in the flow direction of the nozzle channel.

4. The vehicle drive as claimed in claim 1, wherein the propellant line is branched off from the intake air line, the internal combustion engine or the outlet air line downstream of the mixed gas line in the flow direction.

5. The vehicle drive as claimed in claim 1, wherein the vacuum consumer is from a group comprising vacuum distributor, actuator, actuating element and ventilating cavity.

6. The vehicle drive as claimed in claim 1, wherein the serrations, undulations, or both serrations and undulations of the nozzle edge are oriented so as to be inclined in the direction of the center of the nozzle opening.

7. The vehicle drive as claimed in claim 1, wherein the serrations, undulations, or both serrations and undulations of the nozzle edge are of sinusoidal or triangle function-shaped configuration.

8. The vehicle drive as claimed in claim 1, wherein the serrations, undulations, or both serrations and undulations of the nozzle edge are of at least substantially two-dimensional configuration.

9. The vehicle drive as claimed in claim 1, wherein the serrations, undulations, or both serrations and undulations of the nozzle edge are of three-dimensional configuration.

10. The vehicle drive as claimed in claim 1, wherein no nozzle tip is arranged in the nozzle opening.

11. The vehicle drive as claimed in claim 1, wherein a compressor is arranged in the intake air line,
the mixed gas line opening into the intake air line upstream of the compressor in the flow direction, and
the propellant line being branched off from the intake air line, the internal combustion engine or the outlet air line downstream of the compressor in the flow direction.

12. The vehicle drive as claimed in claim 1, wherein an air filter is arranged in the intake air line,
the mixed gas line opening into the intake air line downstream of the air filter in the flow direction, and
the propellant line being branched off from the intake air line, the internal combustion engine or the outlet air line downstream of the opening mixed gas line in the flow direction.

13. The vehicle drive as claimed in claim 1, wherein an intercooler is arranged in the intake air line,
the mixed gas line opening into the intake air line upstream of the intercooler in the flow direction, and
the propellant line being branched off from the intake air line downstream of the opening mixed gas line and upstream of the intercooler in the flow direction.

14. The vehicle drive as claimed in claim 1, wherein the vacuum consumer is from a ventilating cavity group comprising engine housing, crankcase, transmission housing and fuel tank.

15. The vehicle drive as claimed in claim 1, wherein the serrations, undulations, or both serrations and undulations of the nozzle edge protrude into the mixing chamber.

16. A vehicle drive with a vacuum system for a vehicle, with an internal combustion engine which is connected to an intake air line and an outlet air line,
the vacuum system having an ejector,
a propellant line opening into a nozzle channel of a drive nozzle of the ejector,
the nozzle channel opening through a nozzle opening into a mixing chamber of the ejector,
a suction line opening into the mixing chamber, and the mixing chamber opening on an outlet side directly or indirectly into a mixed gas line, and
the mixed gas line opening into the intake air line,
the suction line being connected to a vacuum consumer,
wherein the nozzle opening of the drive nozzle is configured by way of a nozzle edge with serrations, undulations, or both serrations and undulations, wherein the serrations, undulations, or both serrations and undulations of the nozzle edge protrude into the mixing chamber.

* * * * *